(12) United States Patent
Shimojou et al.

(10) Patent No.: US 10,715,404 B2
(45) Date of Patent: Jul. 14, 2020

(54) SLICE CHANGING METHOD AND SLICE CHANGING DEVICE

(71) Applicant: NTT DOCOMO, INC., Tokyo (JP)

(72) Inventors: Takuya Shimojou, Tokyo (JP); Shigeru Iwashina, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 17 days.

(21) Appl. No.: 16/090,419

(22) PCT Filed: Mar. 30, 2017

(86) PCT No.: PCT/JP2017/013409
§ 371 (c)(1),
(2) Date: Oct. 1, 2018

(87) PCT Pub. No.: WO2017/170937
PCT Pub. Date: Oct. 5, 2017

(65) Prior Publication Data
US 2019/0116097 A1    Apr. 18, 2019

(30) Foreign Application Priority Data

Apr. 1, 2016 (JP) ................................ 2016-074245

(51) Int. Cl.
*H04L 12/24* (2006.01)
*G06F 9/455* (2018.01)
(Continued)

(52) U.S. Cl.
CPC .......... *H04L 41/5054* (2013.01); *G06F 9/455* (2013.01); *H04L 41/0813* (2013.01);
(Continued)

(58) Field of Classification Search
CPC ........... H04L 12/4641; H04L 12/06612; H04L 41/0813–0816; H04L 41/0893;
(Continued)

(56) References Cited

U.S. PATENT DOCUMENTS 9,094,303 B2 * 7/2015 Kanada ............... H04L 41/0806
9,483,258 B1 * 11/2016 Labat ........................ G06F 8/60
(Continued)

FOREIGN PATENT DOCUMENTS

JP           201445390 A      3/2014

OTHER PUBLICATIONS

Extended European Search Report in counterpart European Application No. 17775471.0 dated Jul. 31, 2019 (13 pages).
(Continued)

*Primary Examiner* — Brendan Y Higa
(74) *Attorney, Agent, or Firm* — Osha Liang LLP

(57) ABSTRACT

A slice changing device is disclosed including a circuitry configured to acquire, in a case where a condition for changing a slice is satisfied, a connection destination of a slice after change. The circuitry is further configured to notify a communication device that connects a terminal using a slice and a connection destination of a slice of the acquired connection destination, and to release a resource relating to a slice before change after notification by the notifying means, where a service which is used by the terminal is allocated to a slice, and in a case where a condition in which the slice is changed is satisfied, the service is allocated to a slice after change.

7 Claims, 15 Drawing Sheets

(51) Int. Cl.
*H04W 76/19* (2018.01)
*H04W 28/18* (2009.01)
*H04L 12/721* (2013.01)
*H01L 29/08* (2006.01)
*H04L 29/08* (2006.01)

(52) U.S. Cl.
CPC ...... *H04L 41/0816* (2013.01); *H04L 41/0889* (2013.01); *H04L 41/0893* (2013.01); *H04L 41/0896* (2013.01); *H04L 41/50* (2013.01); *H04L 41/5025* (2013.01); *H04L 45/38* (2013.01); *H04L 45/40* (2013.01); *H04L 67/148* (2013.01); *H04W 28/18* (2013.01); *H04W 76/19* (2018.02); *G06F 2009/45575* (2013.01); *H04L 41/12* (2013.01)

(58) Field of Classification Search
CPC ......... H04L 41/12; H04L 45/38; H04L 45/50; H04L 47/76–767; H04L 47/825; H04L 67/14; H04L 67/148; H04L 2012/5621; H04L 29/06612; H04L 41/0876–0896; H04L 41/50–5054; H04L 46/825; G06F 9/455; G06F 9/45533; G06F 9/45558–9/45595; G06F 2008/45558–45595; H04W 36/00–0044; H04W 36/0072–0077; H04W 36/00837
See application file for complete search history.

(56) References Cited

U.S. PATENT DOCUMENTS

| | | | | |
|---|---|---|---|---|
| 9,961,624 | B1* | 5/2018 | Zait | H04W 48/18 |
| 10,111,163 | B2* | 10/2018 | Vrzic | H04W 12/06 |
| 10,129,894 | B2* | 11/2018 | Farmanbar | H04W 16/10 |
| 10,356,663 | B2* | 7/2019 | Shimojou | H04W 24/02 |
| 10,448,320 | B2* | 10/2019 | Vrzic | H04W 48/18 |
| 10,506,489 | B2* | 12/2019 | Vrzic | H04W 36/26 |
| 2009/0205046 | A1* | 8/2009 | Radosavac | H04L 63/105 |
| | | | | 726/23 |
| 2015/0043382 | A1* | 2/2015 | Arora | H04L 41/082 |
| | | | | 370/254 |

OTHER PUBLICATIONS

Ericsson; "Network functions virtualization and software management"; Ericsson White Paper, XP055303485, pp. 1-9, https://www.ericsson.com/res/docs/whitepapers/network-functions-virtualization-and-software-management.pdf; Dec. 1, 2015 (9 pages).

T. Shimojo et al.; "Future Mobile Core Network for Efficient Service Operation"; Proceedings of the 2015 1st IEEE Conference on Network Softwarization (Netsoft), IEEE, XP032782142, pp. 1-6; Apr. 13, 2015 (6 pages).

International Preliminary Report of Patentability (IPRP) issued in PCT/JP2017/013409, dated Oct. 11, 2018 (12 pages).

International Search Report issued in PCT/JP2017/013409, dated Jun. 27, 2017 (1 page).

Written Opinion of the International Searching Authority issued in PCT/JP2017/013409, dated Jun. 27, 2017 (8 pages).

Akihiro Nakao, "Virtual Node Project Virtualization Technology for Building New-Generation Networks", National Institute of Information and Communication Technology; http://www.nict.go.jp/publication/NICT-News/1006/01.html, Jun. 2010 (12 pages).

Tsuyoshi Ogura et al., "A Real-time Large-volume Content Delivery System using Globally Distributed Storage", National Institute of Information and Communications Technology Kenkyu Hokoku, vol. 61, No. 2, Dec. 9, 2015, p. 97-p. 105 (11 pages).

* cited by examiner

Fig.4

| service type | REQUEST SATISFYING CONDITION (SLA-SL) |
|---|---|
| MBB | 2,2,2,2 |
| smartmeter | 1,1,1,1 |
| voice | 2,2,2,1 |
| car | 3,3,2,2 |

Fig.5

| NW slice ID | REQUEST SATISFYING CONDITION (SLA-SL) |
|---|---|
| 1 | 2,2,2,2 |
| 2 | 3,2,2,2 |
| 3 | 3,3,3,3 |

*Fig.6*

| NW slice ID | CONFIGURATION NODE | service type | RESOURCE USAGE RATE |
|---|---|---|---|
| 1 | SGW1, PGW1 | MBB, smartmeter | 80% |
| 2 | SGW2, PGW2 | voice | 20% |
| 3 | SGW3, PGW3 | car | 20% |

*Fig.7*

| service type | NW slice ID | IP address |
|---|---|---|
| MBB | 1 | aa.aa.aa.aa |
| smartmeter | 1 | aa.aa.aa.aa |
| voice | 2 | bb.bb.bb.bb |
| car | 3 | cc.cc.cc.cc |

*Fig.8*

| NW slice ID | Function set |
|---|---|
| 1 | SGW1, PGW1, ... |
| 2 | SGW2, PGW2, ... |

Fig.9

| Function | SLA-SL |
|---|---|
| SGW1 | Mobility 1 |
| SGW2 | Mobility 3 |
| PGW1 | Latency 2 |

*Fig.10*

| Function | VM |
|---|---|
| SGW1 | VM3 |
| HSS2 | VM4 |

Fig.11

| VM | BELONGING HW | Usage |
|---|---|---|
| VM1 | PM1 | 30% |
| VM2 | PM2 | 50% |

*Fig.12*

| HW | Usage |
|---|---|
| PM1 | 90% |
| PM2 | 10% |

(A)

| service type | NW slice ID | IP address |
|---|---|---|
| MBB | 1 | aa.aa.aa.aa |
| smartmeter | 1 | aa.aa.aa.aa |
| voice | 2 | bb.bb.bb.bb |
| car | 3 | cc.cc.cc.cc |

AFTER CHANGE (B)

| service type | NW slice ID | IP address |
|---|---|---|
| MBB | 2 | bb.bb.bb.bb |
| smartmeter | 1 | aa.aa.aa.aa |
| voice | 2 | bb.bb.bb.bb |
| car | 3 | cc.cc.cc.cc |

SLICE CHANGING METHOD AND SLICE CHANGING DEVICE

TECHNICAL FIELD

The present invention relates to a slice changing method and a slice changing device for changing a slice.

BACKGROUND ART

Network systems using virtualization technology in the related art may virtually isolate hardware resources using the virtualization technology disclosed in Non-Patent Literature 1, and generate slices which are virtual networks logically generated on a network infrastructure. Services are allocated to the slices, and thus services can be provided using networks of slices which are independent of each other. Thereby, in a case where slices are allocated to each of services having a diversity of request conditions, it is made easy to satisfy the requested conditions of individual services, and thus it is possible to reduce the amount of signaling processes thereof or the like.

CITATION LIST

Non Patent Literature

[Non-Patent Literature 1] Akihiro Nakao, "Virtualization Technology aimed at a New Generation Network for the Virtualization Node Project, [online], June 2010, National Institute of Information and Communications Technology, [accessed Jan. 26, 2016], the Internet <http://www.nict.go.jp/publication/NICT-News/1006/01.html>

SUMMARY OF INVENTION

Technical Problem

However, the unique allocation of a service to a slice does not necessarily lead to the allocation of the service of an appropriate slice at all times, in a case where the requirements of the service dynamically change or a case where the situation of a resource for providing the slice changes. In addition, from the viewpoint of resource use efficiency, it may not be appropriate to fix a slice. Thus, it is necessary to dynamically change a slice depending on the situation. It may be conceivable to forcibly reattach the connection destination of a slice, but in this case, there is a problem in that instantaneous interruption may occur.

The present invention is contrived in view of such circumstances, and an object thereof is to provide a slice changing method and a slice changing device which make it possible to change a slice without instantaneous interruption.

Solution to Problem

In order to achieve the above object, according to an aspect of the present invention, there is provided a slice changing method in a communication system that changes a slice which is a virtual network generated on a network infrastructure, the method including: an acquiring step of, in a case where a condition for changing a slice is satisfied, acquiring a connection destination of a slice after change; a notifying step of notifying a communication device that connects a terminal using a slice and a connection destination of a slice of the connection destination acquired in the acquiring step; and a releasing step of releasing a resource relating to a slice before change after notification in the notifying step.

In addition, according to an aspect of the present invention, there is provided a slice changing device included in a communication system that changes a slice which is a virtual network generated on a network infrastructure, the device including: acquiring means for, in a case where a condition for changing a slice is satisfied, acquiring a connection destination of a slice after change; notifying means for notifying a communication device that connects a terminal using a slice and a connection destination of a slice of the connection destination acquired by the acquiring means; and releasing means for releasing a resource relating to a slice before change after notification by the notifying means.

According to the slice changing method, in a case where a condition in which the slice is changed is satisfied, the connection destination of a slice after change is acquired, and a communication device is notified of the acquired connection destination before the resource relating to a slice before change is released. Thereby, it is possible to change a connection destination at a timing when a slice is changed, without inquiring a change of the connection destination from the communication device side. That is, it is possible to change a slice without instantaneous interruption.

In the slice changing method, the notifying step may include making a connection request to the connection destination of the slice after change, and then performing the notification. In this case, since the connection request is made to the connection destination of a service and then the notification is performed, it is possible to make appropriate connection to the connection destination of a service from a terminal in accordance with the notification.

In the slice changing method, the condition may be determined on the basis of a resource use status of a slice, and the acquiring step may include acquiring a connection destination of a slice after change determined in accordance with a resource use status for each slice. In this case, since a slice to be allocated is determined in accordance with a resource use status, it is possible to change the connection destination of a service on the basis of a resource load.

In the slice changing method, a service which is used by the terminal may be allocated to a slice, and in a case where a condition in which the slice is changed is satisfied, the service may be allocated to a slice after change. In this case, since the communication device is notified of the connection destination of a slice for which the service is allocated before a resource relating to a slice before change is released, it is possible to use a service without instantaneous interruption.

Advantageous Effects of Invention

It is possible to change a slice without instantaneous interruption.

BRIEF DESCRIPTION OF DRAWINGS

FIG. 4 is a diagram illustrating a service requirement table.

FIG. 5 is a diagram illustrating a slice requirement table.

FIG. 6 is a diagram illustrating a slice allocation table.

FIG. 7 is a diagram illustrating a service type address table.

FIG. 8 is a diagram illustrating a function set table.

FIG. 9 is a diagram illustrating a function requirement table.

FIG. 10 is a diagram illustrating a VM function table.

FIG. 11 is a diagram illustrating a VM usage rate table.

FIG. 12 is a diagram illustrating a hardware usage rate table.

FIG. 13 is a hardware configuration diagram of a service mapping device and the like.

DESCRIPTION OF EMBODIMENTS

Figure 1:
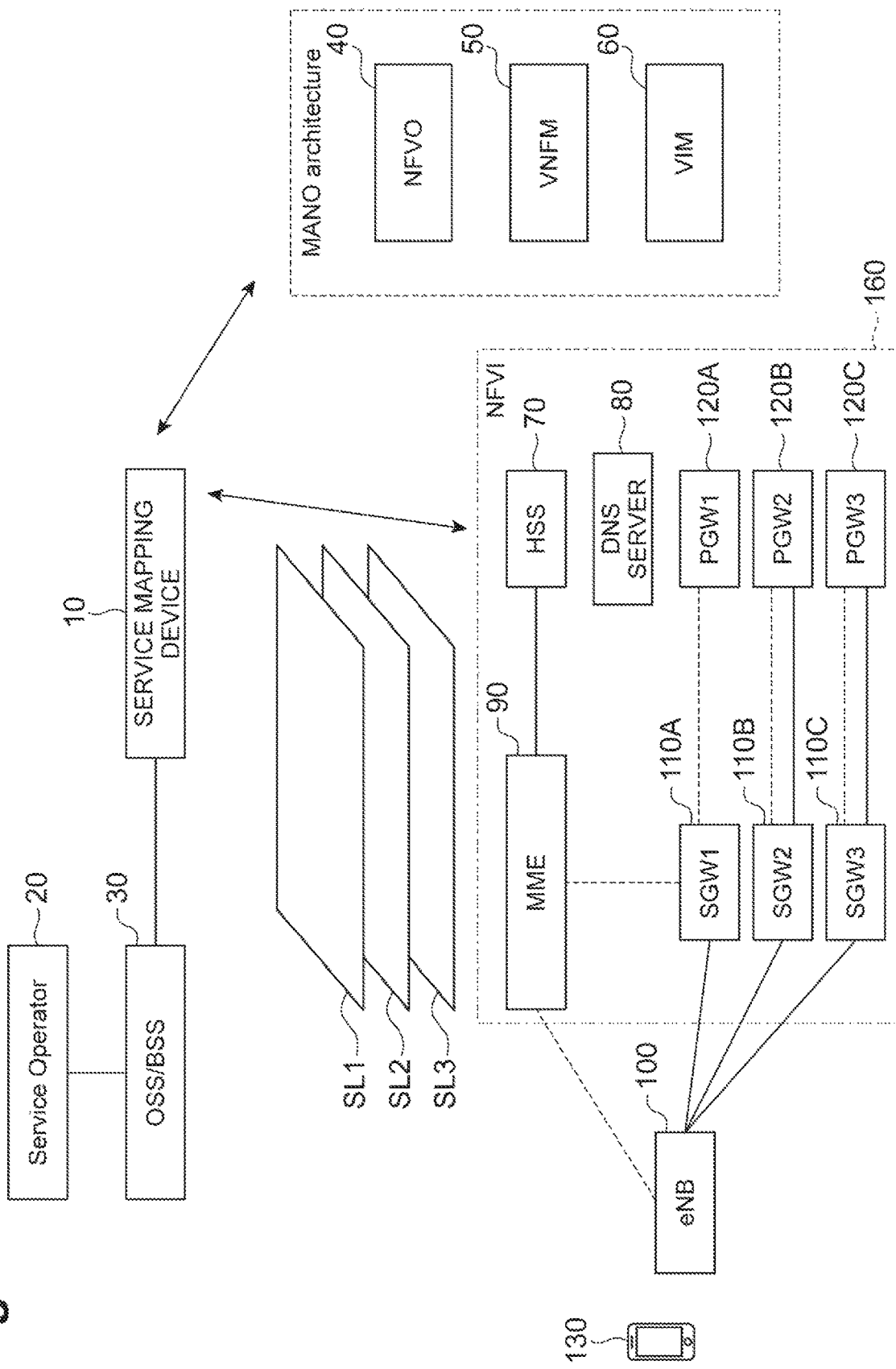
FIG. 1 is a diagram illustrating a configuration of a communication system according to an embodiment of the present invention.

Hereinafter, an embodiment of a slice allocating method according to an aspect of the present invention will be described in detail together with the accompanying drawings. Meanwhile, in the description of the drawings, the same components are denoted by the same reference numerals and signs, and thus description thereof will not be repeated.

FIG. 1 shows a configuration of a communication system including a service mapping device 10 according to the present embodiment. The communication system is a communication system that allocates a service to a slice which is a virtual network. The slice is a virtual network or a service network which is a logically generated on a network infrastructure by virtually isolating resources of the link and node of a network device and coupling the isolated resources. The slices separate resources, and do not interfere with each other. The service refers to a service, using network resources, such as a communication service (private line service or the like) or an application service (service using video distribution, or a sensor device such as an embedded device).

As shown in FIG. 1, the communication system is configured to include a service mapping device 10, a service operator (SO) 20, an operations support system/business support system (OSS/BSS) 30, an NFVO 40, a VNFM 50, a virtualized infrastructure management (VIM) 60, a home subscriber server (HSS) 70, a domain name system (DNS) server 80, a mobility management entity (MME) 90 (slice changing device), an eNB 100, a serving gateway (SGW) 110 (SGW 110A to SGW 110C), a packet data network gateway (PGW) 120 (PGW 120A to PGW 120C), and user equipment (UE) 130. Among these components, the NFVO 40, the VNFM 50, and the VIM 60 are a management & orchestration (MANO) architecture. Meanwhile, the identifier of the SGW 110A is "SGW 1", the identifier of the SGW 110B is "SGW 2", and the identifier of the SGW 110C is "SGW 3". The identifier of the PGW 120A is "PGW 1", the identifier of the PGW 120B is "PGW 2", and the identifier of the PGW 120C is "PGW 3".

These components constitute a core network of the communication system. Meanwhile, components requiring transmission and reception of information therebetween are connected to each other using wires or the like, and can transmit and receive information.

The communication system according to the present embodiment provides a communication function to the mobile communication terminal (UE 130) through a virtual server operating in a virtual machine which is realized on a physical server. That is, the communication system is a virtualized moving object communication network. The communication function is provided to the mobile communication terminal by executing communication processing according to the communication function with the virtual machine.

The service mapping device 10 is a node for performing service management in the communication system, and performing an instruction relevant to a communication function in the communication system. In addition, the service mapping device 10 can be operated by a communication carrier relevant to the communication system.

The SO (Service Operator) 20 is a device that requests a service, and is, for example, a terminal device (such as, for example, a personal computer) of a carrier that provides a service to various users using a virtual network.

The OSS/BSS 30 is a device that accepts a service request from the SO 20, and notifies the service mapping device 10 of the request.

The NFVO 40 is an entire management node (function entity) for performing the management of the entire virtual network (slice) constructed on a NFVI 160 which is a physical resource. The NFVO 40 receives an instruction from the service mapping device 10, and performs a process according to the instruction. The NFVO 40 performs management throughout the entire virtual network constructed in infrastructure and the physical resource of a moving object communication network of a communication service. The NFVO 40 realizes a communication service provided by the virtual network at an appropriate location through the VNFM 50 and the VIM 60. For example, the NFVO may perform life cycle management (specifically, for example, generation, update, schedule control, or event collection) of a service, the management of distribution, reservation and allocation of resources throughout the entire moving object communication network, service instance management, and the management of policies (specifically, for example, the reservation and allocation of resources, or optimum disposition based on geography, law or the like).

The VNFM 50 is a virtual communication function management node (function entity) for adding a function relevant to a service to the NFVI 160 serving as a physical resource (node). A plurality of VNFMs 50 may be provided in the communication system.

The VIM 60 is a physical resource management node (function entity) for managing each physical resource (node). Specifically, the VIM performs the management of allocation, update and recovery of resources, the association of a physical resource with a virtual network, and the management of a list of hardware resources and SW resources (hypervisors). Normally, the VIM 60 performs management for each data center (station). The management of a physical resource is performed by a system according to the data center. The management system of the data center (system for implementing management resources) may be of a type such as OPENSTACK, vCenter or the like. Normally, the VIM 60 is provided for each management system of a data center. That is, a plurality of VIMs 60 that manage each physical resource in the NFVI 160 using systems different from each other are included. Meanwhile, the unit of a physical resource managed using a different management system may not necessarily be a data center unit.

Meanwhile, the NFVO 40, the VNFM 50 and the VIM 60 may be realized by a program being executed on a physical server device (however, these components may be realized on virtualization after the separation of the management system without restricting realization on virtualization). The NFVO 40, the VNFM 50 and the VIM 60 may be realized in separate physical server devices, respectively, and may be realized in the same server device. The NFVO 40, the VNFM 50 and the VIM 60 (and a program for realizing these components) may be provided from separate vendors.

In a case where a slice generation request is received, the NFVO 40 makes a resource securing request for slices (slices SL1, SL2 and the like) to the VIM 60. In a case where the VIM 60 secures a resource in a server device or a switch constituting physical resources, the NFVO 40 defines a slice with respect to these physical resources.

In addition, in a case where the VIM 60 is caused to secure resources in physical resources, the NFVO 40 stores information, having defined a slice with respect to the physical resource, in a table stored by the NFVO 40. The NFVO 40 then makes an installation request for software for realizing a function required for a service to the VNFM 50. The VNFM 50 installs the above software with respect to a physical resource (node such as a server device, a switch device or a router device) secured by the VIM 60 in accordance with the installation request.

In a case where software is installed by the VNFM 50, the NFVO 40 associates a slice and a function realized by the installation with a table stored by the NFVO 40. Slices SL1 to SL3 are slices serving as a unit for allocating a service. It is assumed that the identifier (NW Slice ID) of the slice SL1 is "1", the identifier of the slice SL2 is "2", and the identifier of the slice SL3 is "3".

For example, in a case where the NFVO 40 makes a resource securing request for slices (slice SL1 and slice SL2) to the VIM 60, the VIM 60 gives an instruction to that effect to the physical resource (server device or switch) of the NFVI 160. The NFVO 40 then causes the VNFM 50 to install software for realizing the SGW 110 and the PGW 120 with respect to the secured resource. In a case where a slice is created, the NFVO 40 transmits information of the slice to the service mapping device 10. The service mapping device 10 allocates services (for example, a smartmeter (service for measuring electric power in a digital manner), a mobile broadband service (MBB), or voice (voice output service)) on the basis of the information of the slice.

Figure 2:
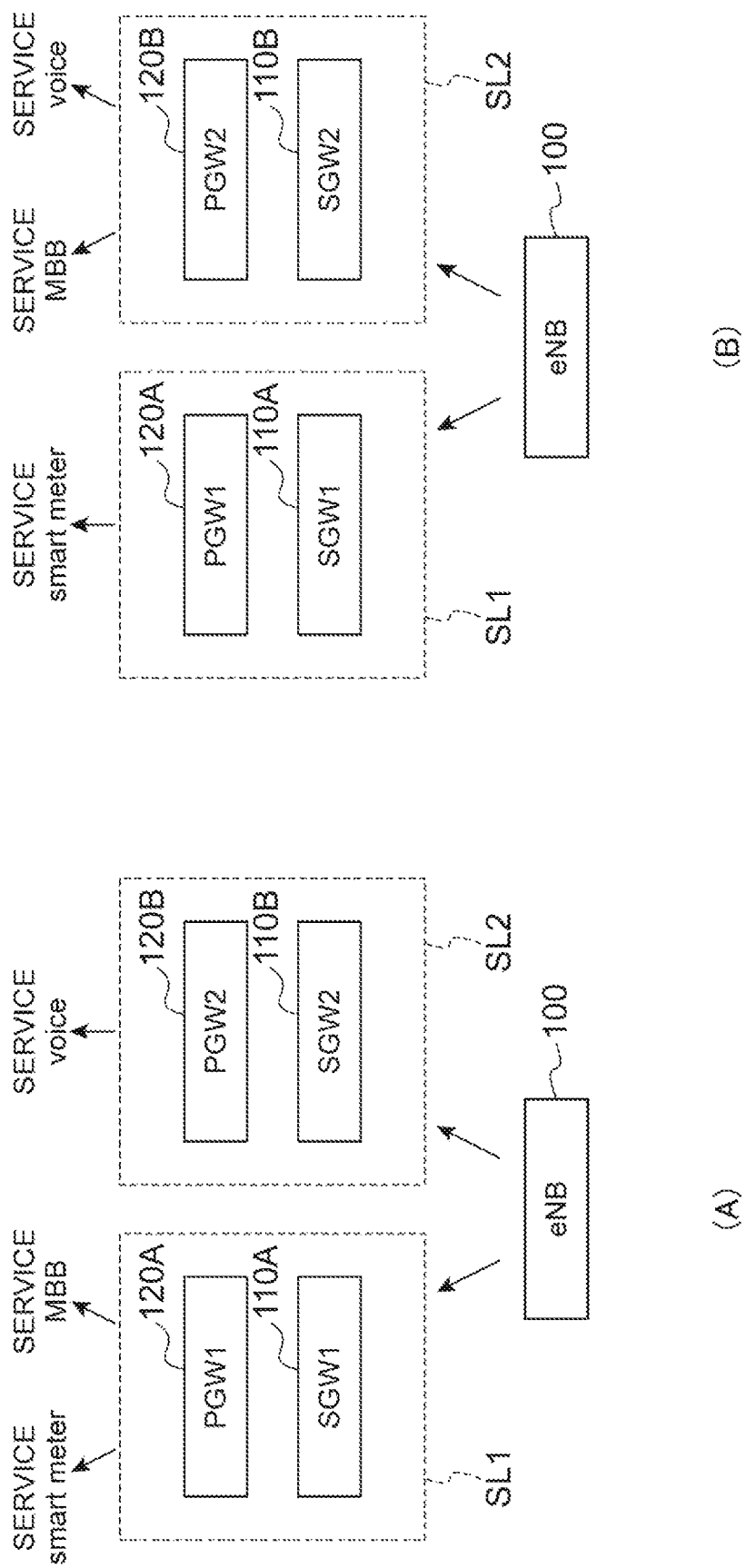
FIG. 2 is a diagram illustrating a correspondence relationship between slices and resources.

For example, as shown in FIG. 2 (A), the slice SL1 includes the SGW 110A and the PGW 120A, and the slice SL2 includes the SGW 110B and the PGW 120B. The service type "smartmeter" and the "MBB" are allocated to the slice SL1. In addition, the service type "voice" is allocated to the slice SL2. The service type indicates the type of service.

The service mapping device 10 acquires a resource usage rate for each slice from the NFVO 40, and changes a slice for allocating a service on the basis of the resource usage rate. For example, in a case where the resource usage rate of the slice SL1 shown in FIG. 2 (A) is equal to or greater than a threshold (for example, 80%) stored in advance, as shown in FIG. 2(B), the service mapping device 10 may allocate the service type "MBB" to the slice SL2.

The NFVI 160 which is the aforementioned physical resource indicates a network formed from a physical resource (node group) constituting a virtual environment. This physical resource conceptually includes a calculation resource, a storage resource, and a transmission resource. Specifically, this physical resource is configured to include a node such as a switch or a physical server which is a physical server device that performs communication processing in the communication system. The physical server is configured to include a CPU (core or a processor), a memory, and storage means such as a hard disk. Normally, a plurality of nodes such as physical servers constituting the NFVI 160 are collectively disposed at the base of a data center (DC) or the like. In the data center, the disposed physical servers are connected to each other through a network inside the data center, and are configured to be able to transmit and receive information therebetween. In addition, the communication system is provided with a plurality of data centers. The data centers are connected to each other through a network, and physical servers provided in different data centers can transmit and receive information therebetween through their networks.

As described above, the VNFM 50 adds various functions to the NFVI 160 serving as a physical resource (node), and thus the NFVI 160 realizes functions of the HSS 70, the DNS server 80, the MME 90, the SGW 110, and the PGW 120.

The HSS 70 has a function of managing subscriber information, in a database, which includes contract information, authentication information, communication service information, terminal type information and coverage information of a communication terminal such as the UE 130. Here, the communication service information refers to information defining the type of communication service which is used by each of the pieces of UE 130. The communication service information includes information (for example, an international mobile subscriber identity (IMSI)) for identifying UE 130, and a service type indicating a communication service which is used by the UE 130.

The DNS server 80 has a function of managing a correspondence relationship between a domain name or a host name and an IP address on a network. Further, the DNS server 80 stores information in which the service type and the address of the SGW 110 are associated with each other. In a case where a transmission request of an address is accepted from the MME 90, the DNS server 80 transmits the address of the SGW 110 according to the request to the MME 90.

The MME 90 has a function of performing the position management of a user terminal (UE 130) covered by a long term evolution (LTE) network, authentication control, and the setting management of a communication path of user data between the SGW 110 and the UE 130. That is, the MME 90 is a communication device for communication connection with the UE 130.

The eNB 100 is a wireless base station connected to the MME 90, and is a communication device having a wireless access control function. The eNB 100 acquires the IP address of a connection destination (for example, SGW 110) of a service from the MME 90, and connects the UE 130 to the connection destination of a service using the IP address.

The SGW 110 has a function of a coverage packet switcher that receives LTE, and transmits and receives user data used in communication service provision to and from the PGW (Packet data network Gateway) 120. A plurality of SGWs 110 are provided corresponding to the requirements of a plurality of communication services.

The PGW 120 is a junction with a PDN (Packet data network), and is a gateway for performing the allocation of an IP address, the transmission of packets to the SGW 110, or the like.

Subsequently, the functions of the service mapping device 10, the NFVO 40, the VNFM 50, the VIM 60, and the MME 90 according to the present embodiment will be described with reference to FIG. 3.

Figure 3:
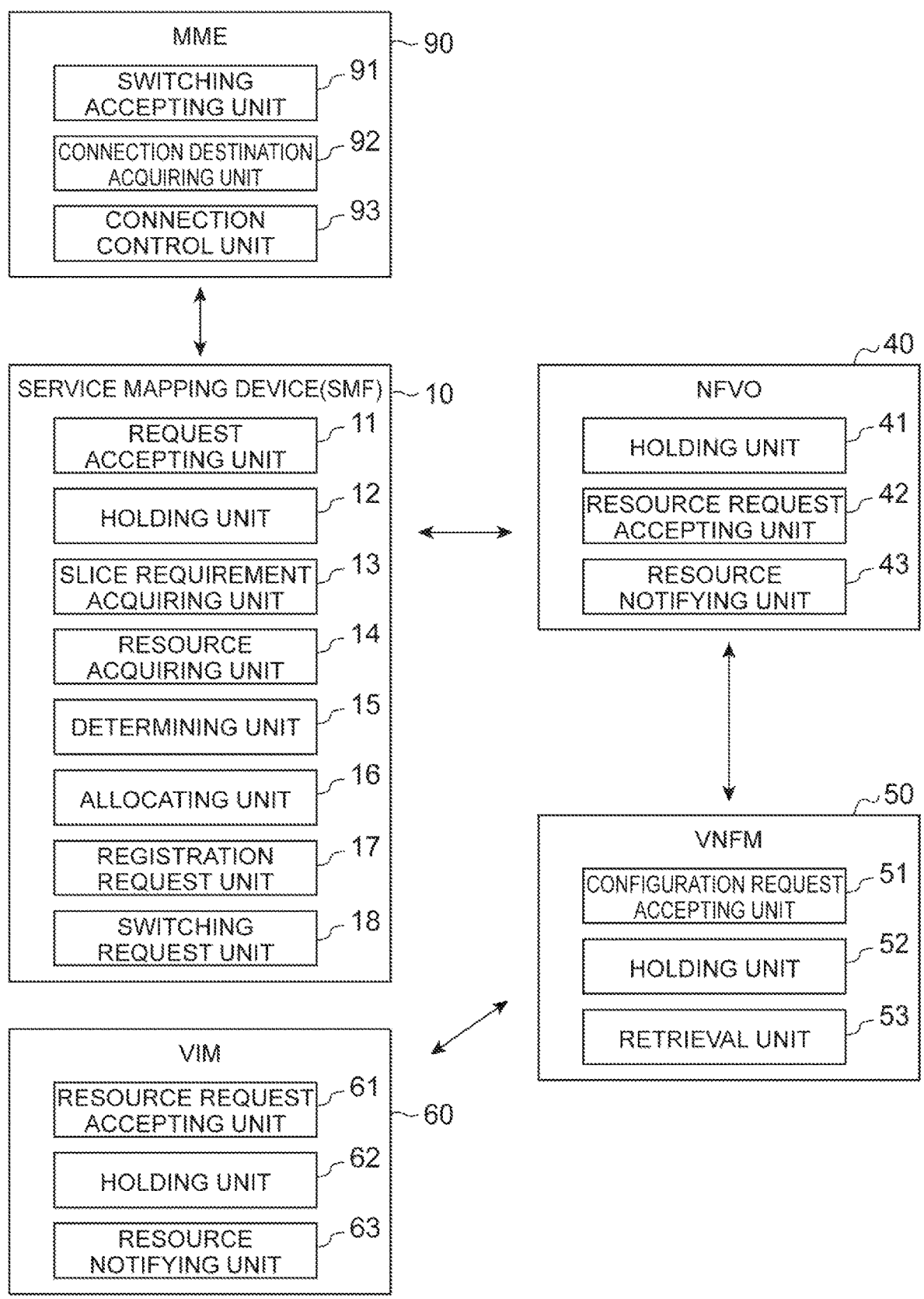
FIG. 3 is a block diagram of devices included in the communication system according to the embodiment of the present invention.

As shown in FIG. 3, the service mapping device 10 includes a request accepting unit 11, a holding unit 12, a slice requirement acquiring unit 13, a resource acquiring unit 14, a determining unit 15, an allocating unit 16, a registration request unit 17, and a switching request unit 18.

The request accepting unit 11 is a portion that accepts a service request including a service requirement which is the requirement of a function in a service from the OSS/BSS 30. Here, the function requirement within a service requirement is a requirement relating to a function for executing a service. Specifically, the necessity of mobility control, a possible access area range, and a service use time are included as the function requirement. The necessity of mobility control means whether or not to require handover control. The access area range means a range (area) in which a service is provided. The service use time means a time slot at which a service is used.

In addition, when a service request is accepted, the request accepting unit 11 receives information indicating the requirement of a function for realizing a service. The information indicating the requirement of a function for realizing a service, as used herein, is SLA-SL.

In a case where the information indicating the requirement of a function for realizing a service is received, the request accepting unit 11 sends out the service requirement to the determining unit 15. In addition, the request accepting unit 11 notifies the slice requirement acquiring unit 13 of the acquisition of a slice requirement.

In addition, in a case where a resource status check timing (for example, once per hour) which is set in advance is detected, the request accepting unit 11 notifies the resource acquiring unit 14 of the acquisition of a resource, and notifies the determining unit 15 of the check timing. In addition, even in a case of the resource status check timing, the request accepting unit 11 notifies the slice requirement acquiring unit 13 of the acquisition of the slice requirement.

The holding unit 12 is a portion that stores various tables. The holding unit 12 stores a service requirement table, a slice requirement table, and a slice allocation table. FIG. 4 shows a service requirement table. As shown in FIG. 4, the service requirement table stores information in which a "Service type" column and a "SLA-SL" column which is a request satisfying condition are associated with each other. Here, the information of the "Service type" column and the "SLA-SL" column is information for specifying a service having a service request accepted from the OSS/BSS 30, and information received from the OSS/BSS 30. The example of FIG. 4 indicates that SLA-SL of a service type which is "MBB" input to the "Service type" column is "2, 2, 2, 2". The information which is input to the "SLA-SL" column in the service requirement table is represented by digitizing four functions requested by a service. These four functions have, for example, relevance to mobility, relevance to communication delay, relevance to data processing capability, relevance to safety, and the like.

Subsequently, FIG. 5 shows a slice requirement table. As shown in FIG. 5, the slice requirement table stores information in which the "NW slice ID" column and the "SLA-SL" column are associated with each other. The information of the "NW slice ID" column and the "SLA-SL" column is information which is received from the NFVO 40. In the example of FIG. 5, a slice having a "NW slice ID" of "1" indicates that the SLA-SL is "2, 2, 2, 2". In a case a slice is newly generated in MANO, the service mapping device 10 acquires information of the "NW slice ID" column regarding the newly generated slice and information of the "SLA-SL" column, and stores these pieces of information in the slice requirement table of the holding unit 12. The information which is input to the "SLA-SL" column in the slice requirement table is represented by digitizing four functions capable of being provided by a slice. These four functions have, for example, relevance to mobility, relevance to communication delay, relevance to data processing capability, relevance to safety, and the like.

Subsequently, FIG. 6 shows a slice allocation table. As shown in FIG. 6, this table stores information in which a "NW slice ID" column, a "Configuration node" column, a "Service type" column, and a "Resource usage rate" column are associated with each other. The information of the "NW slice ID" column, the "Configuration node" column, and the "Resource usage rate" column is information which is received from the NFVO 40. The information of the "Service type" column is information which is received from the OSS/BSS 30. In the example of FIG. 6, a slice having a "NW slice ID" of "1" indicates that the configuration node is "SGW 1, PGW 1", the service type (Service type) is "MBB, smartmeter", and the resource usage rate is "80%". In a case where a slice is newly generated in MANO, the service mapping device 10 acquires pieces of information of the "NW slice ID" column regarding a newly generated slice, the "Configuration node" column, the "Resource usage rate" column, and the "SLA-SL" column, and stores these pieces of information in the slice requirement table and the slice allocation table of the holding unit 12. In addition, in a case where a service type allocated to a slice is determined, the service mapping device 10 associates the determined service type in the "Service type" column of the slice.

The slice requirement acquiring unit 13 is a portion that refers to the slice requirement table, shown in FIG. 5, which is stored in the holding unit 12, and acquires the requirement (SLA-SL) of each slice. In a case where the requirement of the slice is acquired, the slice requirement acquiring unit 13 sends out the acquired requirement to the determining unit 15.

In a case where a resource acquisition request is accepted from the request accepting unit 11, the resource acquiring unit 14 makes a resource acquisition request to the NFVO 40. The resource acquiring unit 14 receives resource information from the NFVO 40 in accordance with the resource acquisition request. The resource acquiring unit 14 updates the resource information to the slice allocation table. In addition, the resource acquiring unit 14 refers to the slice allocation table in accordance with the request of the request accepting unit 11, and sends out a resource usage rate for each slice to the determining unit 15.

The determining unit 15 is a portion that determines a slice corresponding to the service requirement of a service accepted by the request accepting unit 11. For example, in a case where the request accepting unit 11 accepts the service allocation request from the OSS/BSS 30, the determining unit 15 compares SLA-SL received from the request accepting unit 11 with SLA-SL of the information of the slice requirement table, shown in FIG. 5, acquired from the slice requirement acquiring unit 13, and determines an ID, as a slice ID, which is set in the "NW slice ID" column of the information of the slice requirement table including all values (equal to or greater than the value of the received SLA-SL) of SLA-SL received from the request accepting unit 11. The determining unit 15 refers to the slice allocation table, and makes an allocation request to the allocating unit 16 in a case where the same service type as a service type to be allocated has already been allocated, and a case where the determined slice ID and a slice ID having already been allocated to the service type are different from each other. In addition, the determining unit 15 refers to the service requirement table, and makes an allocation request to the allocating unit 16 in a case where the same service type has not already been allocated.

In addition, in a case where the resource information is acquired from the resource acquiring unit 14, the determining unit 15 determines a slice which is allocated to a service type to be allocated, on the basis of SLA-SL corresponding to each service type of the service requirement table, SLA-SL of the slice requirement table, and a resource use status for each slice acquired by the resource acquiring unit 14. Specifically, the determining unit 15 refers to the SLA-SL of the slice requirement table, and determines the allocation of a service type to a slice having room for a resource use status (having space in a resource) within a slice satisfying SLA-SL corresponding to each service type of the slice allocation table. The wording "having room for a resource use status" as used herein means that the average value of usage rate of a resource (VM constituting the slice or hardware for realizing the VM) for each slice is lowest. In this case, in a case where the slice determined this time and the slice previously allocated are different from each other, an allocation request is made to the allocating unit 16. In a case where an allocation request is made to the allocating unit 16, the determining unit 15 gives notice of terminal information (for example, user ID), a service type, and a slice to be allocated.

The allocating unit 16 is a portion that performs allocation to a slice determined the determining unit 15 from a slice associated with a service to be allocated in the slice allocation table. The allocating unit 16 updates the slice allocation table so as to associate a service type to be allocated with a slice of an allocation destination.

The registration request unit 17 is a portion that makes a registration request of a slice and a service type, changed by the allocating unit 16, to the DNS server 80. The registration request unit 17 transmits a service type and a slice ID of a slice after change to the DNS server 80.

Here, an example of information stored by the DNS server 80 is shown in FIG. 7. As shown in FIG. 7, the DNS server 80 stores pieces of information in which a "Service type" column, a "NW slice ID" column, and an "IP Address" column are associated with each other in accordance with the registration request. A service type is input to the "Service type" column. A slice ID is input to the "NW slice ID" column. Address information indicating an access destination is input to the "IP Address" column. When the registration request is received, the DNS server 80 newly registers a service type and the address information in a case where information of a service type to be requested is not input. In a case where a service type has already been registered, address information corresponding to the service type is changed to address information to be requested. Meanwhile, the DNS server 80 further stores information in which a slice ID and the IP address of a device serving as a connection destination of a slice indicated by the slice ID are associated with each other.

The switching request unit 18 is a portion that requests a slice change of a service type to the MME 90. That is, the switching request unit 18 is a portion that makes a change request of a connection destination of a service. Specifically, in a case where a slice and a service type after change are accepted from the allocating unit 16, the switching request unit 18 transmits the slice and the service type after change to the MME 90.

Subsequently, the function of the NFVO 40 will be described. The NFVO 40 includes a holding unit 41, a resource request accepting unit 42, and a resource notifying unit 43.

The holding unit 41 is a portion that stores various tables. The holding unit 41 stores a function set table and a function requirement table. FIG. 8 shows a function set table. This function set table is a table that stores information in which a "NW Slice ID" column and a "Function Set" column are associated with each other. A slice ID for identifying a slice is input to the "NW Slice ID" column. Information indicating of a function set is input to the "Function Set" column. FIG. 9 shows a function requirement table. The function requirement table is a table that stores information in which a "Function" column and a "SLA-SL" column are associated with each other. Information indicating a function is input to the "Function" column shown in FIG. 9. In addition, information indicating SLA-SL corresponding to the function is input to the "SLA-SL" column.

In a case where a resource request is accepted from the service mapping device 10, the resource request accepting unit 42 acquires a function set from the function set table of the holding unit 41. The resource request accepting unit 42 transmits each function of the function set to the VNFM 50, and makes a VM acquisition request. The resource request accepting unit 42 acquires VM from the VNFM 50. Subsequently, the resource request accepting unit 42 makes a transmission request of the resource use situation of each VM to the VIM 60. In a case where the resource use situation is received from the VIM 60, the resource request accepting unit 42 notifies the resource notifying unit 43 of the resource use situation for each slice.

The resource notifying unit 43 transmits the resource use situation received from the resource request accepting unit 42 to the service mapping device 10 for each slice. Meanwhile, the resource notifying unit 43 may transmit the average value of the resource use situation of VM (VM capable of realizing the function set of a slice) corresponding to a slice as the resource use situation of the slice, or may transmit a largest value of the resource use situation within VM corresponding to a slice as the resource use situation of the slice.

Subsequently, the VNFM 50 will be described. The VNFM 50 includes a configuration request accepting unit 51, a holding unit 52, and a retrieval unit 53. The configuration request accepting unit 51 is a portion that accepts a VM acquisition request from the NFVO 40. In a case where a VM acquisition request is accepted from the NFVO 40 together with a target function, the configuration request accepting unit 51 notifies the retrieval unit 53 of the target function. The configuration request accepting unit 51 sends the notification to the retrieval unit 53, and then acquires results of retrieval performed by the retrieval unit 53 from the retrieval unit 53. In a case where the retrieval results are acquired from the retrieval unit 53, the configuration request accepting unit 51 transmits the retrieval results to the NFVO 40.

Figure 10:
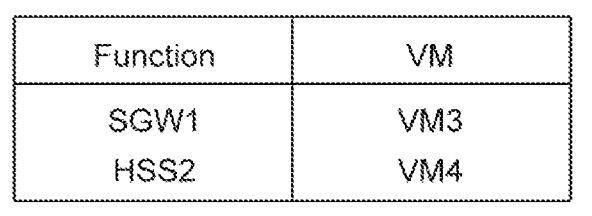

The holding unit 52 is a portion that holds various types of information. The holding unit 52 holds software (for example, repository). In addition, the holding unit 52 stores a VM function table having information in which VM and a function are associated with each other, with the exception of the above software. FIG. 10 shows an example of the VM function table. As shown in FIG. 10, a "Function" column, a "VM" column, and an "address" column (not shown) indicating the address of the "VM" are stored in association with each other. Information indicating a function is input to the "Function" column. Information (such as, for example, an identifier of VM) indicating VM for executing the function is input to the "VM" column.

The retrieval unit 53 is a portion that retrieves the VM function table of the holding unit 52 in accordance with a request from the configuration request accepting unit 51, and notifies the configuration request accepting unit 51 of the retrieval results. In a case where a target function is received from the configuration request accepting unit 51, the retrieval unit 53 retrieves the VM function table, and transmits "VM" having information of the "Function" column coincident with the target function, as retrieval results, to the configuration request accepting unit 51.

The VIM 60 includes a resource request accepting unit 61, a holding unit 62, and a resource notifying unit 63. The resource request accepting unit 61 is a portion that accepts a request of a resource status, together with target VM, from the NFVO 40. In a case where the resource status request is accepted, the resource request accepting unit 61 retrieves information of the holding unit 62 as a retrieval key of the target VM. The resource request accepting unit 61 notifies the resource notifying unit 63 of the retrieval results.

Figure 11:
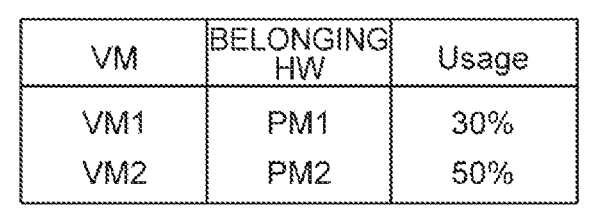
Figure 12:
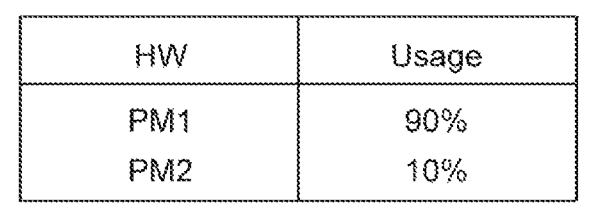

The holding unit 62 is a portion that stores resource information. Usage rate information of VM and usage rate information of hardware for realizing the VM are stored as the resource information. FIG. 11 shows an example of the usage rate information of VM. As shown in FIG. 11, the holding unit stores information in which a "VM" column, a "belonging HW" column, and a "Usage" column are associated with each other. Information indicating (for example, an identifier of VM) VM is input to the "VM" column. Information indicating (for example, an identifier of a server) hardware (for example, server) for realizing VM is input to the "belonging HW" column. Information indicating the usage rate of VM is input to the "Usage" column. Subsequently, FIG. 12 shows an example of the usage rate information of hardware. As shown in FIG. 12, the holding unit stores information in which a "HW" column and a "Usage" column are associated with each other. Information for identifying hardware is input to the "HW" column. Information indicating the usage rate of hardware is input to the "Usage" column.

The resource notifying unit 63 is a portion that receives retrieval results from the configuration request accepting unit 51, and transmits the retrieval results to the NFVO 40.

Subsequently, the MME 90 will be described. The MME 90 includes a switching accepting unit 91, a connection destination acquiring unit 92 (acquiring means), and a connection control unit 93 (notifying means, releasing means). The switching accepting unit 91 is a portion that accepts a switching request from the service mapping device 10. In a case where a slice ID and a service type are received from the service mapping device 10, and the switching request is received, the switching accepting unit 91 sends out the slice ID and the service type to the connection destination acquiring unit 92.

The connection destination acquiring unit 92 is a portion that acquires, in a case where a slice of a service type is changed by the service mapping device 10, the connection destination of a service after change. In a case where a slice ID and a service type are acquired from the switching accepting unit 91, the connection destination acquiring unit 92 transmits the slice ID and the service type to the DNS server 80, and acquires an IP address corresponding to the slice ID and the service type. The connection destination acquiring unit 92 sends out the acquired IP address to the connection control unit 93.

The connection control unit 93 is a portion that performs various types of connection control. Specifically, in a case where the IP address corresponding to the slice ID and the service type is received from the DNS server 80, the connection control unit 93 makes a session request to the connection destination of a service. In addition, the connection control unit 93 sends a notification indicating the switching of the connection destination to the eNB 100. In addition, the connection control unit 93 sends the notification, and then makes a resource release request relating to the SGW 110A to the eNB 100.

Figure 13:
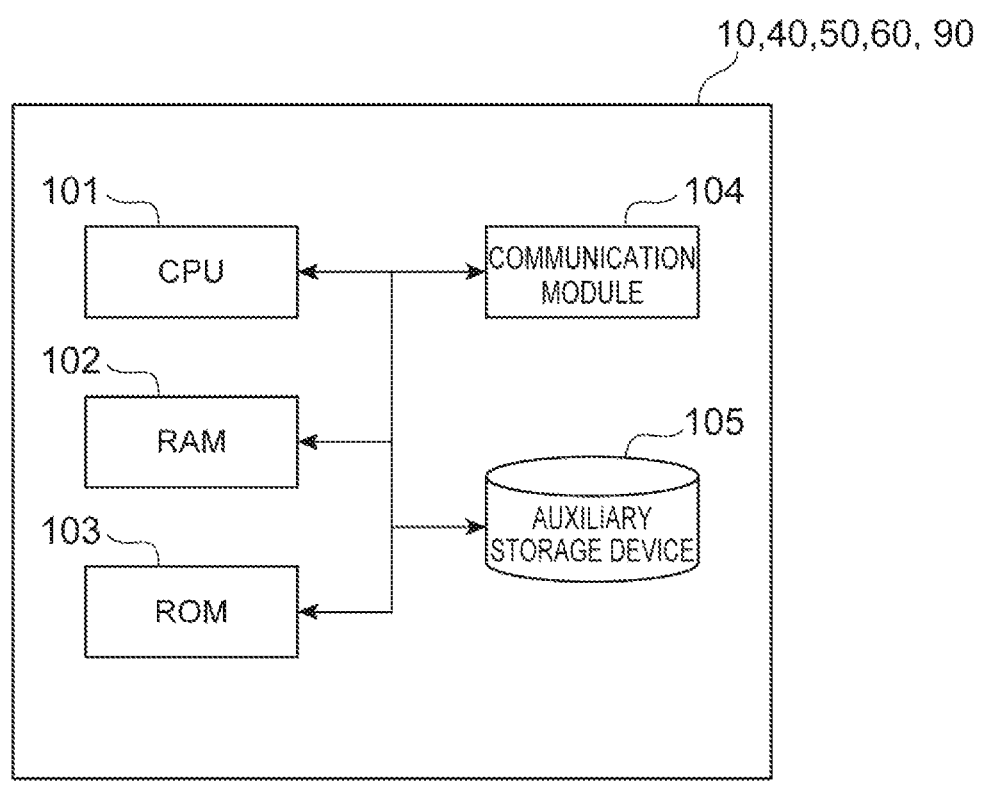

Physically, as shown in FIG. 13, the service mapping device 10, the NFVO 40, the VNFM 50, the VIM 60 and the MME 90 are configured as a computer system including one or a plurality of CPUs 101, a RAM 102 and a ROM 103 which are main storage devices, a communication module 104 (Transmitter or Receiver) which is a data receiving and transmitting device, a hard disk, an auxiliary storage device 105 (Memory) such as a flash memory, and the like. In the service mapping device 10, predetermined computer software is caused to be read on hardware such as the CPU 101 or the RAM 102 shown in FIG. 4, to thereby bring the communication module 104 into operation under the control of the CPU 101, and read out and write data in the RAM 102 or the auxiliary storage device 105, and thus a series of functions in the service mapping device 10 are realized.

Meanwhile, instead of a processor such as the CPU 101 executing each function in FIG. 3, all or some of the functions may be configured to execute each function by constructing a dedicated integrated circuit (IC). For example, the function may be executed by constructing a dedicated integrated circuit for performing image processing or communication control.

Regardless of whether it is called software, firmware, middleware, microcode, hardware description language, or another name, software can be widely construed to refer to commands, a command set, codes, code segments, program codes, a program, a sub-program, a software module, an application, a software application, a software package, a routine, a sub-routine, an object, an executable file, an execution thread, an order, a function, or the like.

In addition, Software, a command, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of a transmission medium.

Meanwhile, the service mapping device 10, the NFVO 40, the VNFM 50, the VIM 60 and the MME 90 may be constituted by a computer system composed of a plurality of server devices. In addition, nodes other than those stated above which are included in a communication system may also be realized by a server device having the hardware configuration. In addition, some or all of the functions of the eNB 100 or the UE 130 (mobile communication terminal) may be realized using hardware such as an application specific integrated circuit (ASIC), a programmable logic device (PLD), or a field programmable gate array (FPGA). In addition, the eNB 100 or the UE 130 may be realized by a computer device including a processor (CPU), a communication interface for network connection, a memory, a computer readable storage medium having a program held thereon. That is, the eNB 100, the UE 130 or the like according to an embodiment of the present invention may function as a computer that performs a process according to an aspect of the present invention.

Here, the processor, the memory and the like are connected to each other through a bus for communicating information. In addition, the computer readable recording medium is, for example, a flexible disk, a magneto-optic disc (for example, compact disc, digital versatile disc, Blu-ray (Registered Trademark) disk), a smart card, a flash memory device (for example, card, stick, key drive), a ROM, an erasable programmable rom (EPROM), an electrically erasable programmable rom (EEPROM), a compact disc-ROM (CD-ROM), a RAM, a register, a removable disk, a hard disk, a floppy (Registered Trademark) disk, a magnetic strip, a database, a server, and other appropriate storage mediums. In addition, the program may be transmitted from a network through an electrical communication line. In addition, the eNB 100 or the UE 130 may include an input device such as an input key, or an output device such as a display.

The functional configurations of the eNB 100 and the UE 130 may be realized by the aforementioned hardware, may be realized by a software module which is executed by a processor, and may be realized by a combination of both. The processor controls the entire user terminal by bringing an operating system into operation. In addition, the processor reads out a program, a software module or data from a storage medium into a memory, and executes various types of processing in accordance therewith.

Here, the program may be a program for causing a computer to execute each operation described in the embodiment of the invention. For example, the control unit of a mobile communication terminal may be realized by a control program, stored in a memory, which is operated in a processor, and other functional blocks may also be realized similarly.

Figure 14:
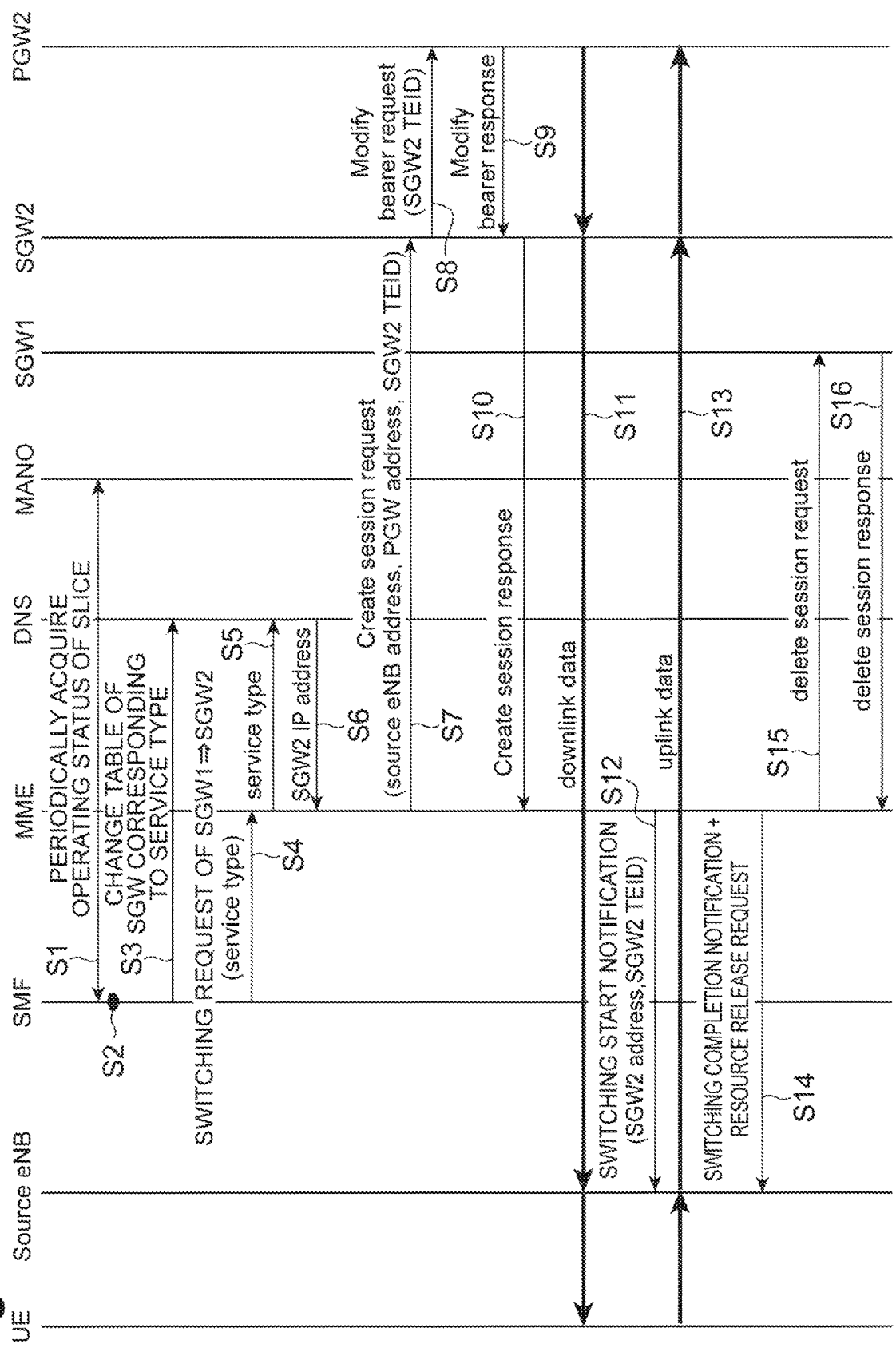
FIG. 14 is a sequence diagram illustrating a connection destination change process.

Subsequently, processes which are executed in the communication system according to the present embodiment will be described with reference to a sequence diagram of FIG. 14. Here, a processing method of performing an allocation change of a slice will be described on the basis of the situation of a resource at a predetermined timing. Meanwhile, it is assumed that a service is allocated to a slice in advance.

At a predetermined timing, the resource acquiring unit 14 of the service mapping device 10 transmits a slice ID and a function set of the slice to the NFVO 40, acquires the use situation of a resource, and updates the acquire result to the slice allocation table (step S1). At the predetermined timing, the resource acquiring unit 14 refers to the slice allocation table, and sends out the resource use situation of each slice to the determining unit 15. The determining unit 15 determines whether there is a slice in which the usage rate is tight. For example, as shown in FIG. 6, in a case where the resource usage rate of a slice having a "NW Slice ID" of "1" in the slice allocation table is 80%, it is determined that the usage rate is tight. Meanwhile, since the slice has a plurality of services (MBB, smartmeter) associated therewith, the determining unit 15 allocates any one of the services to another slice. Here, the determining unit 15 sets MBB to a service to be allocated, on the basis of a priority order between service types which are set in advance.

Subsequently, the determining unit 15 determines a slice to be allocated, on the basis of the SLA-SL of each slice and the use status of VM of a function set for each slice (step S2). Specifically, the determining unit 15 specifies a record of the slice requirement table having SLA-SL that satisfies the SLA-SL of a service type stored in the service requirement table, and determines the allocation to a slice having most space in a resource within a slice indicated by the record. Since a slice having a slice ID of 2 satisfies the SLA-SL of a service having a service type of MBB, the determining unit 15 determines the allocation to a slice having a slice ID of 2. The allocating unit 16 updates the slice allocation table so as to associate a service type to be allocated with a slice of an allocation destination.

Figure 15:
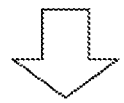
FIG. 15 is a diagram illustrating a change in the service type address table.

Subsequently, the registration request unit 17 makes a registration request of a slice corresponding to a service type to the DNS server 80 (step S3). Here, FIG. 15 shows an example of information stored in the DNS server 80 in a case where a service having a service type of MBB is allocated to the slice having a slice ID of 1 and a slice having a slice ID of 2. FIG. 15(A) is an example of information stored in the DNS server 80 before the registration request is received from the service mapping device 10. As shown in FIG. 15(A), the service type "MBB" is configured such that that the slice ID is associated with 1. That is, it is shown that a slice having a slice ID of 1 is allocated to the service type "MBB". The registration request unit 17 transmits the service type "MBB" and the slice ID "2" to the DNS server 80, and makes the registration request. In accordance with the registration request, as shown in FIG. 15(B), the DNS server 80 changes a slice ID corresponding to the service type "MBB" to "2", and changes an IP address corresponding to the service type "MBB" to "bb.bb.bb.bb" which is the IP address of a slice ID2. The switching request unit 18 notifies the MME 90 of a service type, and makes a switching request (step S4).

In a case where the switching accepting unit 91 of the MME 90 receives a service type from the service mapping device 10, the connection destination acquiring unit 92 transmits the service type to the DNS server 80 and makes an acquisition request of connection destination information (step S5). The connection destination acquiring unit 92 of the MME 90 acquires the connection destination information (IP address) from the DNS server 80 (step S6: acquiring step). The connection control unit 93 of the MME 90 transmits the address of the eNB 100, the address of the PGW 120, the address of the SGW 110B which is a connection destination, and a tunnel endpoint identifier (TEID) generated by the MME 90, and makes a session request to the device (SGW 110B) which is a connection destination (step S7).

The SGW 110B transmits the IP address of the SGW 110B and the TEID to the PGW 120B and makes a bearer update request (Modify bearer request) (step S8). The PGW 120B makes a response to the SGW 110B in accordance therewith (Modify bearer response) (step S9).

In a case where a response is received from the PGW 120A, the SGW 110B transmits a response to the MME 90 (Create session response) (step S10). Thereby, downlink data flows (step S11). Using the reception of the above response as a trigger, the connection control unit 93 of the MME 90 transmits the IP address of the SGW 110B and the TEID to the eNB 100 and makes a switching start notification (step S12: notifying step). Thereby, uplink data flows from the UE 130 to the PGW 120A (step S13). The connection control unit 93 of the MME 90 makes a switching completion notification to the eNB 100 and makes a resource release request relating to the SGW 110A (step S14: releasing step). After the switching completion notification, the connection control unit 93 makes a session deletion request to the SGW 110A, and receives a response based on the session deletion followed by the termination of a process (step S15, S16).

Next, operational effects of the communication system of the present embodiment will be described. The determining unit 15 of the service mapping device 10 determines a slice having SLA-SL which corresponds to the service requirement (SLA-SL) of a service to be allocated (which satisfies the service requirement). The allocating unit 16 allocates a service to a slice for which the service to be allocated is determined. The connection destination acquiring unit 92 acquires the address of the connection destination (SGW 110B) of the service to be allocated, and the connection control unit 93 notifies the eNB 100 of the IP address of the connection destination before releasing a resource relating to the SGW 110A.

In this case, after a slice coincident with the service requirement is determined and before the resource relating to the SGW 110A which is the connection destination of a slice before change is released, the communication system notifies the eNB 100 of the SGW 110B which is the connection destination of a slice after change, and thus can change the connection destination at a timing when a slice is changed, without performing an attachment process from the eNB 100 side. That is, it is possible to change the connection destination of a service without instantaneous interruption. As a result, it is possible to use a service without instantaneous interruption.

In addition, the connection control unit 93 makes a connection request to the connection destination (SGW 110B) of a service, and then notifies the eNB 100 of the address of the connection destination. In this case, since the connection request is made to the connection destination of a service and then a notification is performed, it is possible to make appropriate connection to the connection destination of a service from a terminal in accordance with the notification.

In addition, the resource acquiring unit 14 acquires a resource status for each slice at a predetermined timing. In a case where the resource status satisfies a predetermined condition, the slice requirement acquiring unit 13 specifies the SLA-SL of each slice together with the service requirement of a service in which a slice has already been allocated. The determining unit 15 determines a slice to be allocated, on the basis of the service requirement of a service, the SLA-SL of each slice, and a resource status.

In this case, since a slice to be allocated to a service is determined in consideration of status information of a resource, it is possible to dynamically allocate the connection destination of a service even in a case where a resource status fluctuates.

Meanwhile, "Information" described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, an optical field or photons, or an arbitrary combination thereof.

The term "determining" used in this specification may include various types of operation. The term "determining" may encompass, for example, calculating, computing, processing, deriving, investigating, looking up (for example, looking up in a table, a database or a separate data structure), ascertaining, and the like. In addition, the term "determining" may encompass receiving (for example, receiving of information), accessing (for example, accessing of data in a memory), and the like. In addition, the term "determining" may encompass resolving, selecting, choosing, establishing, comparing, and the like.

An expression "on the basis of -" which is used in this specification does not refer to only "on the basis of only ~," unless otherwise described. In other words, the expression "on the basis of ~" refers to both "on the basis of only ~" and "on the basis of at least ~."

The order of the processing sequences, the sequences, the flowcharts, and the like of the aspects/embodiments described above in this specification may be changed as long as they are compatible with each other. For example, in the methods described in this specification, various steps as elements are described in an exemplary order but the methods are not limited to the described order.

The aspects described in this specification may be used alone, may be used in combination, or may be switched during implementation thereof. In addition, notification of predetermined information (for example, notification of "X") is not limited to explicit transmission, and may be performed by implicit transmission (for example, the notification of the predetermined information is not performed).

In the present embodiment described in this specification, a singular form is intended to include a plural form unless the context indicates otherwise. Therefore, for example, when a "device" is mentioned, it should be understood that the device includes plural devices as well as a single device.

Hereinbefore, the present invention has been described in detail, but it is apparent to those skilled in the art that the present invention should not be limited to the embodiments described in this specification. The present invention can be implemented as modified and changed embodiments without departing from the spirit and scope of the present invention, which are determined by the description of the scope of claims. Therefore, the description of this specification is intended for illustrative explanation only, and does not impose any limited interpretation on the present invention.

REFERENCE SIGNS LIST

10 Service mapping device
11 Request accepting unit
12 Holding unit
13 Slice requirement acquiring unit
14 Resource acquiring unit
15 Determining unit
16 Allocating unit
17 Registration request unit
20 SO
30 OSS/BSS
40 NFVO
41 Holding unit
42 Resource request accepting unit
43 Resource notifying unit
50 VNFM
51 Configuration request accepting unit
52 Holding unit
53 Retrieval unit
60 VIM
61 Resource request accepting unit
62 Holding unit
63 Resource notifying unit
70 HSS
80 DNS server
90 MME
91 Switching accepting unit
92 Connection destination acquiring unit
93 Connection control unit
100 eNB 101 CPU
102 RAM
103 ROM
104 Communication module
105 Auxiliary storage device
110 SGW
120 PGW
130 UE
160 NFVI

The invention claimed is:

1. A slice changing method in a communication system that changes a slice, which is a virtual network generated on a network infrastructure, the method comprising:
   identifying, from a slice allocation table, a condition for changing a first slice to a connection destination;
   determining whether the condition for changing the first slice to the connection destination is satisfied;
   in a case where the condition for changing the first slice is satisfied, acquiring address information of the connection destination of a target slice, the connection destination being a location of the target slice after change;
   notifying a communication device that connects a terminal using the first slice and the connection destination of the target slice of the address information of the connection destination; and
   releasing a resource relating to the first slice before changing the first slice to the connection destination and after notifying the communication device,
   wherein a service used by the terminal is allocated to the target slice after changing the first slice to the connection destination.

2. The slice changing method according to claim 1, the method further comprising:
   making a connection request to the connection destination before notifying the communication device.

3. The slice changing method according to claim 1,
   wherein the condition is determined based on a resource use status of the first slice, and
   acquiring the connection destination of the target slice comprises acquiring the connection destination of the target slice, which is determined in accordance with a resource use status for each of the first slice and the target slice.

4. The slice changing method according to claim 2,
   wherein the condition is determined based on a resource use status of the first slice, and
   acquiring the connection destination of the target slice comprises acquiring the connection destination of the target slice, which is determined in accordance with a resource use status for each of the first slice and the target slice.

5. A slice changing device included in a communication system that changes a slice, which is a virtual network generated on a network infrastructure, the device comprising a circuitry configured to:
   identify, from a slice allocation table, a condition for changing a first slice to a connection destination;
   determine whether the condition for changing the first slice to the connection destination is satisfied;
   acquire, in a case where the condition for changing the first slice is satisfied, address information of the connection destination of a target slice, the connection destination being a location of the target slice after change;
   notify a communication device that connects a terminal using the first slice and the connection destination of the target slice of the address information of the connection destination; and
   release a resource relating to the first slice before changing the first slice to the connection destination and after notifying the communication device,
   a service used by the terminal is allocated to the target slice after changing the first slice to the connection destination.

6. The slice changing method according to claim 1, wherein the service is allocated to the target slice without performing an attachment process from the communication device side.

7. The slice changing method according to claim 1, the method further comprising:
   notifying only to the communication device without notifying the terminal.

* * * * *